United States Patent [19]

Isshiki et al.

[11] 4,239,741
[45] Dec. 16, 1980

[54] PROCESS FOR PRODUCING HYDRAZINE SULFATE

[75] Inventors: Tomiya Isshiki; Tetsuo Tomita, both of Tokyo; Toshiaki Kozaki; Osamu Aoki, both of Matsudo; Mitsuo Abe, Tokyo; Norio Takeda; Mitsuo Miura, both of Matsudo; Yoshiyuki Aoki, Tokyo; Takao Kondo, Tokyo; Kaoru Tsuyuki, Tokyo, all of Japan

[73] Assignee: Mitsubishi Gas Chemical Company, Inc., Tokyo, Japan

[21] Appl. No.: 955,166

[22] Filed: Oct. 27, 1978

[30] Foreign Application Priority Data

Nov. 7, 1977 [JP] Japan .............................. 52/133322

[51] Int. Cl.³ .............................................. C01B 21/54
[52] U.S. Cl. ................................................... 423/388
[58] Field of Search ........................................ 423/388

[56] References Cited

U.S. PATENT DOCUMENTS 2,931,707  4/1960  Meyer et al. ..................... 423/388

FOREIGN PATENT DOCUMENTS 51-97600  8/1976  Japan .

OTHER PUBLICATIONS

Curtius and Rauterberg, Journal für praktische Chemie, 44, 200 (1891).

*Primary Examiner*—Earl C. Thomas
*Assistant Examiner*—Wayne A. Langel
*Attorney, Agent, or Firm*—Armstrong, Nikaido, Marmelstein & Kubovcik

[57] ABSTRACT

Hydrazine sulfate having a relatively large particle diameter and a high purity is produced by hydrolysis of benzophenoneazines by sulfuric acid having a concentration of 75% by weight or less in an amount of 1.1 times by mole or more the stoichiometric amount in a very high conversion and a high yield with less operational loss.

7 Claims, No Drawings

PROCESS FOR PRODUCING HYDRAZINE SULFATE

This invention relates to an improved process for producing hydrazine sulfate by hydrolysis of benzophenoneazines.

Hydrazine sulfate is the well known industrial chemical having various applications, and is useful as a starting material for producing hydrazine, and the reaction of the present invention can be represented by the following reaction formula (1), when benzophenoneazine is used as the benzophenoneazines:

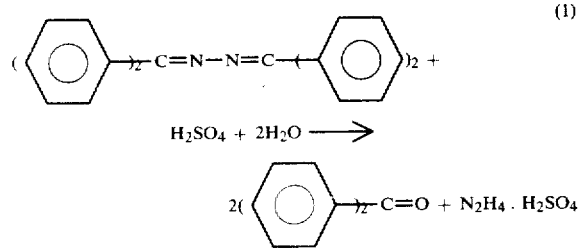

The known processes for producing benzophenoneazines are a process for producing benzophenoneazine by synthesizing benzophenoneimine through condensation of benzophenone with ammonia, and air-oxidizing the resulting benzophenoneimine (U.S. Pat. No. 2,870,206), a process for producing benzophenoneazine from benzophenone, ammonia and oxygen in one step (Japanese Laid-Open Patent Specification No. 8251/76), etc.

Thus, a process for producing hydrazine sulfate, as represented by the following reaction formula (2), where benzophenone is used as the benzophenones, can be completed by combining these prior processes for producing benzophenoneazines, and thus the process is very industrially useful.

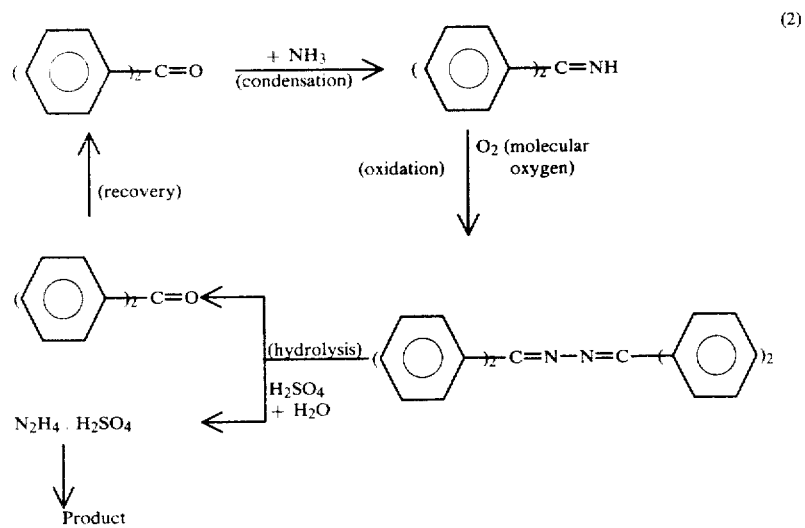

The conventional processes for producing hydrazine sulfate by hydrolysis of benzophenoneazines in an industrial scale are disclosed in British Pat. No. 843,587 and Japanese Laid-open Patent Specification No. 97600/76.

According to the example of British Pat. No. 843,587, a molten mixture of 49% by weight of benzophenoneazine and 51% by weight of benzophenone was admixed with 66° Bé concentrated sulfuric acid in an amount of 2 moles in excess of the stoichiometric amount, then thoroughly mixed with stirring, and then admixed with a stoichiometric amount of water, whereby hydrazine sulfate is obtained in a yield of 95%. On the other hand, the process disclosed in Japanese Laid-open Pat. No. 97600/76 is characterized by using alcohols having 4 to 10 carbon atoms as a solvent, and according to the example thereof, hydrazine sulfate is obtained in a yield of 94%, using about 15-fold amount of n-octanol and the stoichiometric amount of dilute sulfuric acid. The yields of these conventional processes are about 95%, but are not sufficient and satisfactory for the application to said process (2). That is, these yields correspond to a loss by about 5% in yield in one step, and such a loss is not neglible. Furthermore, this means that there is a large amount of unreacted benzophenoneazine, and when the unreacted benzophenoneazine is mixed in the recovered benzophenone, the benzophenoneazine is thermally decomposed to produce biphenyl or benzonitrile in the synthesis of benzophenoneimine from benzophenone and ammonia. That is, troubles are brought about due to such side reactions. Still furthermore, an amount of sulfuric acid dissolved in benzophenones, etc. is not neglible, either, and also the resulting hydrazine sulfate is obtained only as fine particles or a dilute aqueous solution. As a result, the steps for recovering benzophenone, sulfuric acid, hydrazine sulfate, etc. are inevitably complicated owing to these disadvantages.

The present inventors have made extensive studies on considerable increase in reaction yield and steps for easy recovery of benzophenone, sulfuric acid, and hydrazine sulfate, etc., and, as a result, have completed the present invention.

The present invention provides a process for producing hydrazine sulfate, characterized by using sulfuric acid having a concentration of 75% by weight or less in an amount of at least 1.1 times by mole of stoichiometric amount in hydrolysis of benzophenoneazines by sulfuric acid.

The benzophenoneazines used in the present invention are compounds represented by the general formula:

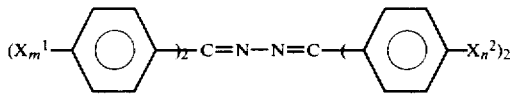

wherein $X^1$ and $X^2$ are selected from alkyl groups having 1 to 4 carbon atoms, chlorine, bromine, fluorine and nitro groups, and may be same or different, and m and n are 0 or an integer of from 1-3. The benzophenoneazines include their solutions, such as molten mixtures of the benzophenones, and mixtures with a solvent capable of dissolving benzophenoneazines and benzophenones and having a low mutual solubility with an aqueous sulfuric acid solution, for example, mixtures with such solvents as chloroform, dichloroethane, benzene, toluene, xylene, mesitylene, chlorobenzene, dichlorobenzene, diphenylether, etc.

In the present process, the amount and concentration of sulfuric acid used, and the temperature are important.

In the present invention, the amount of sulfuric acid used is usually at least 1.1 times by mole the stoichiometric amount (that is, moles equal to the moles of benzophenoneazines), preferably 1.5 to 20 times by mole the stoichiometric amount, and 2.0 to 10 times by mole the stoichiometric amount particularly in the case of continuous operation. The amount of sulfuric acid used is a sum total of sulfuric acid made present in the entire reaction system. In the reaction of the present invention, the rate of reaction is abruptly lowered at a high conversion, and such a tendency is remarkable when the amount of sulfuric acid used is less than 1.1 times by mole the stoichiometric amount. In order to obtain a high conversion, the reaction unpreferably requires a very long time.

The concentration of sulfuric acid used is preferably 75% by weight or less, and more preferably 40 to 60% by weight, in the ordinary operation to increase the particle diameters of resulting hydrazine sulfate. However, the preferable ranges depend upon specific operations; for example, in the continuous operation using a plurality of reactors in series, it is also preferable to use sulfuric acid having a concentration of 55–75% by weight in an amount of 0.5–1.5 times the stoichiometric amount in the initial reactor and use sulfuric acid having a concentration of 5–55% by weight in an amount of 2.0 times or more the stoichiometric amount in the successive reactor to shorten the reaction time and increase the particle diameter of the resulting hydrazine sulfate. When the concentration of sulfuric acid exceeds 75%, the rate of hydrolysis reaction is increased, but the amount of sulfuric acid to be dissolved in the benzophenones is also increased. That is, the amount of sulfuric acid to be recovered from the benzophenones or thrown away is considerably increased, and the resulting hydrazine sulfate is turned to finer particles, rendering its purification and recovery disadvantageous.

Preferable reaction temperature is usually in a range of 60° to 140° C., and a more preferable range is 80° to 120° C. When the reaction temperature is lower than 60° C., a satisfactory rate of reaction cannot be obtained, whereas the reaction temperature exceeding 140° C. is not preferable because of a fear that side reactions would take place. In order to increase the rate of reaction, the operation must be conducted at a higher temperature, where it is sometimes desirable to conduct the operation under pressure.

Furthermore, the reaction time depends upon starting material composition, reaction temperature, operating procedure, etc. of reaction system, but usually is appropriately selected from the range of 0.1 to 10 hours.

The reaction of the present invention is carried out in the foregoing manner, but examples of preferable process will be further described below in relation to specific operating procedures.

In the case of batch operation, benzophenoneazines and sulfuric acid are charged into a reactor so that their composition ratio may be in the preferable range, and subjected to reaction at a temperature of 80°–120° C. with stirring for 10–120 minutes. After the completion of reaction, the reaction solution is immediately separated into an organic phase layer and an aqueous phase layer.

In the aqueous phase layer, there are solid particles of the resulting hydrazine sulfate, which are filtered off. The resulting crude hydrazine sulfate is simply washed, for example, by an organic solvent and then by water, or by methanol, etc., and then dried, whereby a product having a purity of 98% or higher can be obtained.

In the organic phase layer, there are substantially no unreacted benzophenoneazines, but a very small amount of suspended sulfuric acid, which can be removed therefrom by washing with water or aqua ammonia. The aqueous phase layer, that is, the aqueous sulfuric acid solution, can be used as such in the hydrolysis reaction by supplementing the solution with a corresponding amount of sulfuric acid to that consumed in the reaction.

In the case of continuous operation, the reaction solution that has reached the predetermined degree of hydrolysis by batch operation is charged into a reactor at the start of reaction, or alternately benzophenone or dilute sulfuric acid, or a mixture of both benzophenone and dilute sulfuric acid is charged into a reactor, and heated to 80°–120° C., and then a benzophenoneazine solution and dilute sulfuric acid are separately and continuously pumped into the reactor. Their feed rates are so adjusted that benzophenoneazine and sulfuric acid can be at the predetermined molar ratio and the predetermined liquid residence time can be obtained. That is, the feed rates are so adjusted that a residence time in one reactor can be 1–2 hours. The liquid withdrawal from the reactor may be conducted by overflow, but the withdrawal by a pump is not objectionable. When two or more reactors are employed, the reaction solution in the preceding reactor must be all fed as such successively to the succeeding reactor by overflow. When sulfuric acid of different concentrations is used in the respective reactors, sulfuric acid must be supplied to the individual reactors. The reaction solution is separated into an organic phase layer and an aqueous phase layer at the final stage, and solid hydrazine sulfate present in the aqueous phase layer is filtered off.

When two or more reactors are used, it is not always necessary that all the reactors each have an equal reactor capacity or have an equal residence time. In order to carry out reaction under as complete mixing as possible, it is necessary to conduct effective mixing during the reaction.

In the foregoing procedure, a stationary state can be attained usually within a few hours, and thereafter a stable operation can be continued for a long period of time, and the conversion reaches 99% or more. The reaction solution continuously withdrawn is immediately separated into two layers with a very good separability. The reaction solution is then treated in the same manner as in the batch operation.

In the ordinary hydrolysis reaction, the rate of reaction is abruptly lowered at a high conversion, and thus the reaction is usually carried out at a plurality of stages to prevent an increase in the reaction time of continuous reaction and also shorten the reaction time. In the present invention, a similar effect can be obtained by conducting the reaction at a plurality of stages. As described above, the process comprising using sulfuric acid having a concentration of 55–75% by weight in an amount of 0.5–1.5 times by mole the stoichiometric amount in the initial reactor, and sulfuric acid having a concentration of 5–55% by weight in an amount of 2.0 times or more by mole the stoichiometric amount in the successive reactor as one example of conducting the reaction at stages is particularly preferable, because it has a considerably large effect upon enhancing the rate of reaction and the particle diameter of the resulting hydrazine sulfate.

When the reaction is carried out continuously according to the present invention, it is not necessary to separate the individual reactors to independent ones. Any apparatus can be employed, so far as the apparatus can fulfil the object of the present invention. For example, a vertical reactor of multi-stage, where a column is partitioned stagewise by trays, and a shaft is provided vertically through the column at its center to make stirring at the individual stages, a horizontal reactor of multi-stage, where an oblong vessel is longitudinally partitioned with a plurality of partition walls having successively reduced heights, a columnnar reactor of counter-current contact type, etc. can be preferably employed.

In the present invention as described above, a very high conversion and a very high yield can be obtained with less occurrence of side reaction such as sulfonation by sulfuric acid, etc. The recovery of benzophenone, sulfuric acid and hydrazine sulfate can be very readily carried out, and also operating loss is very small in the practice of the present invention. Furthermore, the resulting hydrazine sulfate has a larger particle diameter, and can be very readily recovered and purified, and a high purity product can be obtained. Thus, the present invention has various advantages as mentioned above, and provides an industrially distinguished process.

Now, the present invention will be described in detail below, referring to examples and comparative examples.

EXAMPLE 1

A molten mixture of 72.0 g (0.2 moles) of benzophenoneazine and 216 g of benzophenone was charged into a 4-necked flask having a capacity of 1 l, provided with a stirrer, a thermometer, a reflux cooler and a dropping funnel, and then admixed dropwise with 206 g of dilute sulfuric acid having a concentration of 47.6% by weight (corresponding to 1 mole of $H_2SO_4$). Then, the flask was heated and stirred for 70 minutes to conduct reaction, while keeping the liquid temperature at 100° C.

After discontinuing the stirring, the reaction solution was left standing for a few minutes while heating the reaction solution, and then a liquid phase was removed by decantation. Crystals of hydrazine sulfate settled at the bottom of flask were filtered off through a glass filter, and taken out. The filtered crystals were washed with methanol, and then dried, whereby 26.3 g of hydrazine sulfate having a plurality of 98.2% was obtained. Microscopic observation revealed that the particle diameter of crystals was 1000μ at largest and 200μ at smallest, and about 700μ on average.

By the analysis of methanol used for washing the crystals, 2.0 g of benzophenone and 3.9 g of sulfuric acid were detected. Thus, it was found that 7.6% by weight of benzophenone and 14.8% by weight of sulfuric acid were attached to the resulting hydrazine sulfate before the washing on the basis of the purified hydrazine sulfate. The benzophenone and sulfuric acid could be returned as such to the hydrolysis reaction system by distilling off the methanol therefrom.

Quantitative determination of unreacted benzophenone remaining in the reaction solution by gas chromatography revealed that the degree of hydrolysis was 99.4%. The reaction solution was immediately separated to two phases. Benzophenone recovered from the organic phase was washed twice with water while keeping the benzophenone warm so as not to be solidified, and the resulting two runs of washing water were joined together, and titrated with an alkali, whereby 0.1 g of sulfuric acid was detected. This amount of sulfuric acid corresponded to 0.5% of the stoichiometric amount required for the hydrolysis.

Dilute sulfuric acid in the aqueous layer had a concentration of 43%, and 173 g of sulfuric acid solution (layer) was recovered. Sulfuric acid could be used as such in the hydrolysis reaction by adjusting the concentration to 47.6% by weight by freshly adding 15.8 g of 98% concentrated sulfuric acid thereto.

COMPARATIVE EXAMPLE

A molten mixture of 72.0 g (0.2 moles) of benzophenoneazine and 216 g of benzophenone was charged in a 4-necked flask having a capacity of 1 l, provided with a stirrer, a thermometer, a reflux cooler, and a dropping funnel, and a flask was heated to keep the liquid temperature at 100° C. Then, 47 g of dilute sulfuric acid having a concentration of 83.1% by weight (corresponding to 0.4 moles of $H_2SO_4$) was slowly dropwise added thereto with stirring through the dropping funnel over a period of 30 minutes. 20 minutes thereafter, the stirring was continued, and then the reaction was discontinued.

After the completion of reaction, the reaction mixture was filtered through a glass filter while keeping the reaction mixture warm. The filtered crystals were washed with methanol and dried, whereby 26.4 g of hydrazine sulfate having a purity of 98.0% was obtained. Microscopic observation of the crystals revealed that the particles were very fine, and the particle diameters were all under 100μ.

By analysis of methanol used for washing the crystals, 6.9 g of benzophenone and 10.1 g of sulfuric acid were detected. Thus, it was found that 26.1% by weight of benzophenone and 38.3% by weight of sulfuric acid were attached to the crystals before the washing on the basis of the purified crystals.

Quantitative determination of unreacted benzophenoneazine remaining in the reaction solution revealed that the degree of hydrolysis was 99.6%. Benzophenone recovered from an organic phase layer by settling the reaction solution was washed twice with water, while keeping benzophenone warm so as not to be solidified, and two runs of the washing water were joined together, and titrated with an alkali, whereby 8.1 g of sulfuric acid was detected. This amount of sulfuric acid corresponded to 41.3% of the stoichiometric amount required for the hydrolysis.

EXAMPLE 2

A molten mixture of 66.0 g (0.184 moles) of benzophenoneazine and 84.0 g of benzophenone, 150 g of o-dichlorobenzene, and 190 g of dilute sulfuric acid having a concentration of 47.6% by weight (corresponding to 0.923 moles of $H_2SO_4$) were charged in a flask similar to that of Example 1, and the flask was heated to keep the liquid temperature at 120° C. and the reaction was conducted with stirring for 40 minutes.

After the completion of reaction, the reaction mixture was cooled to room temperature, and filtered through a glass filter. Filtered crystals were washed with methanol, and then dried, whereby 24.1 g of hydrazine sulfate having a purity of 98.5% was obtained.

By analysis of methanol used for washing the crystals, 0.9 g of benzophenone and 2.5 g of sulfuric acid were detected. Thus, it was found that 3.7% by weight of benzophenone and 10.4% by weight of sulfuric acid were attached to the crystals before the washing on the basis of the purified crystals.

Quantitative determination of unreacted benzophenoneazine remaining in the reaction solution by gas chromatography revealed that the degree of hydrolysis was 99.6%. The reaction solution was immediately separated into two phases, and the o-dichlorobenzene solution of benzophenone recovered from the organic phase layer was washed twice with water, and two runs of the washing water were joined together, and titrated with an alkali, whereby 0.1 g of sulfuric acid was detected. This amount of sulfuric acid corresponded to 0.6% of the stoichiometric amount required for the hydrolysis.

Dilute sulfuric acid in the aqueous phase layer could be recovered in the same manner as in Example 1.

EXAMPLE 3

A solution of a mixture of 72.1 g (0.2 moles) of benzophenoneazine and 30.9 g of benzophenone in 300 ml of chloroform, and 206 g of dilute sulfuric acid having a concentration of 47.6% by weight were charged into a flask similar to that of Example 1, and the flask was heated, so that chloroform could be gently refluxed. Stirring was continued for two hours while keeping said state.

After the completion of reaction, the reaction mixture was cooled to room temperature, and filtered through a glass filter. The filtered crystals were washed successively with chloroform and water and finally with methanol, and then dried, whereby 26.1 g of hydrazine sulfate having a purity of 98.3% was obtained.

By analysis of the methanol used for washing the crystals, 0.9 g of benzophenone and 2.6 g of sulfuric acid were detected. Thus, it was found that 3.4% by weight of benzophenone and 10.0% by weight of sulfuric acid were attached to the crystals before the washing on the basis of the purified crystals.

Quantitative determination of unreacted benzophenoneazine remaining in the reaction solution by gas chromatography revealed that the degree of hydrolysis was 98.6%.

A chloroform solution of benzophenone from the organic phase layer was twice washed with water, and two runs of the washing water were joined together, and titrated with an alkali, whereby 0.2 g of sulfuric acid was detected. This amount of sulfuric acid corresponded to 10% of the stoichiometric amount required for the hydrolysis.

Dilute sulfuric acid from the aqueous phase layer could be recovered in the same manner as in Example 1.

EXAMPLE 4

A separable reactor consisting of a cylindrical glass vessel having a net capacity of 1 l and a lid for the vessel was used. Feed lines each for a benzophenoneazine solution and dilute sulfuric acid are fixed to two openings on the lid, and a cooler and a thermowell for thermocouple were fixed to other two openings on the lid, and a stirrer was provided through an opening at the center of the lid to provide stirring blades in the reactor. 4 baffle plates made of Teflon were fixed at the wall surface of the reactor to conduct effective mixing. An outlet for the reaction solution was provided on the reactor at a position near the bottom of the reactor, and a glass tube was inserted through the outlet into the reactor, and a liquid residence volume in the reactor was kept to the predetermined one by adjusting the length of the glass tube.

By adjusting the length of the glass tube inserted through the outlet, the liquid residence volume was controlled to 400 ml, and then 344 g (300 ml) of a solution consisting of 25% by weight of benzophenoneazine, 25% by weight of benzophenone, and 50% by weight of o-dichlorobenzene, and 160 g (100 ml) of dilute sulfuric acid having a concentration of 73% by weight were charged into the reactor, and the outside wall of the reactor was heated by electric heating. After the liquid temperature reached 100° C., a batchwise reaction was conducted for one hour, and then the benzophenoneazine solution having the same composition as above and sulfuric acid having the same concentration of 73% were supplied at feed rates of 172 g/hr and 80 g/hr, respectively, by means of individual plunger pumps.

Overflowed solution was stored in a decantation tank, and a cock at the bottom of the tank was opened at predetermined intervals to withdraw a slurry solution of hydrazine sulfate as a lower layer of separated two phase layers at first, and then a benzophenone solution as an upper layer separately.

The resulting crude hydrazine sulfate and the benzophenone solution were analyzed. That is, 100 g of hydrazine sulfate was taken out of the resulting hydrazine sulfate and washed with methanol, and the cleaned crystals were dried and weighed, whereby 72.6 g of crystals with a purity of 98.3% were obtained. Then, the methanol used for the washing was analyzed, whereby 10.4 g of benzophenone and 16.5 g of sulfuric acid were detected. Thus, it was found that 14.3% by weight of benzophenone, 22.7% by weight of sulfuric acid, and 0.7% by weight of water were attached to the hydrazine sulfate before the washing on the basis of the purified hydrazine sulfate.

300 g of the o-dichlorobenzene solution of benzophenone recovered from the organic phase layer as the upper layer was taken out, and washed twice with water, and two runs of the washing water were joined together, and titrated with an alkali, whereby 4.1 g of sulfuric acid was detected. This amount of sulfuric acid corresponded to 20.1% of the stoichiometric amount required for the hydrolysis.

After about one hour, a stationary state was reached, and thereafter the reaction was continued for 100 hours, and the following results were obtained.

Hydrazine sulfate having a purity of 98.3% was obtained at a rate of 15.76 g per hour at a reaction temperature of 100° C., an average liquid residence time of 2 hours, and an average degree of hydrolysis of 99.8%.

The recovered sulfuric acid had a concentration of 70.3% by weight, and could be used as such in the hydrolysis reaction by adjusting the concentration to 73% by weight by freshly adding concentrated sulfuric acid thereto.

EXAMPLE 5

Stirred vessels having net capacities of 1 l and 2 l similar to that of Example 4 were connected to each other in series to conduct reaction in a divided manner. The second vessel having the net capacity of 2 l was positioned below the overflow liquid outlet of the first vessel, so that all the volume of the overflowed solution from the first vessel could enter into the second vessel.

The liquid residence volumes in the first and second vessels were adjusted to 700 ml each.

A solution consisting of 22% by weight of benzophenoneazine and 78% by weight of benzophenone, heated at 120° C. and dilute sulfuric acid having a concentration of 52.1% by weight were fed to the first vessel at feed rates of 480 g (490 ml)/hr and 314 g (210 ml)/hr, respectively, by means of individual plunger pumps. At the same time as the start of the feeding, the first vessel was heated by electric heating to keep the first vessel warm. After one hour, the first vessel was full and an overflow was started. At the same time, stirring of the first vessel was started, and the second vessel was kept warm by electric heating. After further one hour, the second vessel was full, and stirring of the second vessel was started. The solution overflowed from the second vessel was stored in a decantation vessel having a capacity of 3 l, and a cock at the bottom of the decantation vessel was opened at predetermined intervals to withdraw a slurry solution of hydrazine sulfate as a lower layer of separated two phase layers at first, and then a benzenephenone solution at an upper layer. The benzophenone solution as the upper layer was washed with aqua ammonia to recover benzophenone.

The slurry solution of hydrazine sulfate was filtered to obtain hydrazine sulfate. The filtered crude hydrazine sulfate was washed with methanol to obtain it as a product. The washing methanol was titrated with an alkali to quantitatively determine the amount of acid contained therein, and concentrated and then extracted with benzene, and the extract was subjected to gas chromatography to quantitatively determine the amount of benzophenone contained therein.

That is, 100 g of hydrazine sulfate was taken out of the resulting hydrazine sulfate, and washed with methanol, and the cleaned crystals were dried and weighed, whereby 81.4 g of hydrazine sulfate having a purity of 98.5% was found.

Then, by analysis of the methanol used for the washing, 10.4 g of sulfuric acid and 6.6 g of benzophenone were detected. Thus, it was found that 8.1% by weight of benzophenone, 12.8% by weight of sulfuric acid, and 2.0% by weight of water were attached to the hydrazine sulfate before the washing on the basis of purified hydrazine sulfate.

300 g of benzophenone recovered from the organic phase layer was taken out, and washed twice with water, and two runs of the washing water were joined together, and titrated with an alkali, whereby 0.12 g of sulfuric acid was detected. This amount of sulfuric acid corresponded to 0.7% of the stoichiometric amount required for the hydrolysis.

After about 5 hours, a stationary state was reached, and thereafter the reaction was continued for 100 hours. The following results were obtained. Hydrazine sulfate having a purity of 98.5% was obtained at a rate of 38.7 g/hr at a reaction temperature of 120° C., an average liquid residence time of one hour for the first vessel and one hour for the second vessel, and an average degree of hydrolysis of 99.9%. Average particle diameter of hydrazine sulfate was 1,500μ.

The recovered sulfuric acid had a concentration of 48.5%, and could be used as such in the hydrolysis reaction by adjusting the concentration to 52.1% by freshly adding concentrated sulfuric acid thereto.

EXAMPLE 6

Reaction was carried out in quite same reactors as used in Example 5, except that the second vessel was modified so that sulfuric acid could be fed to the second vessel.

Liquid residence volumes were adjusted to 520 ml for the first vessel and 1,450 ml for the second vessel.

A solution consisting of 22% by weight of benzophenoneazine and 78% by weight of benzophenone, heated to 120° C., and sulfuric acid having a concentration of 73% by weight were fed to the first vessel at feed rates of 1,440 g/hr and 130 g/hr, respectively, by means of individual plunger pumps. The first vessel was heated to keep reaction temperature at 120° C., and stirred. The entire volume of the solution overflowed from the first vessel was introduced into the second vessel, and dilute sulfuric acid having a concentration of 30% by weight was freshly fed to the second vessel at a feed rate of 1,500 g/hr by means of a plunger pump. The second vessel was heated to keep reaction temperature at 120° C., and stirred.

The reaction solution overflowed from the second vessel was treated in the same manner as in Example 5.

After about 2 hours, a stationary state was reached, and thereafter the reaction was continued for 40 hours. The following results were obtained. Hydrazine sulfate having a purity of 98.4% was obtained at a rate of 115 g per hour at a reaction temperature of 120° C. and an average residence time of 20 minutes for the first vessel, and a reaction temperature of 120° C. and an average residence time of 30 minutes for the second vessel, and an average degree of hydrolysis of 99%.

What is claimed is:

1. A process for producing hydrazine sulfate by hydrolysis of benzophenoneazines by sulfuric acid, which comprises using sulfuric acid having a concentration of from 40 to 60% by weight in an amount of 1.5 to 20 times by mole of the stoichiometric amount in the hydrolysis.

2. A process according to claim 1, wherein the hydrolysis is carried out at a plurality of stages.

3. A process according to claim 2, wherein the hydrolysis is carried out at two stages.

4. A process according to claim 1, wherein the sulfuric acid is used in an amount of 2.0 to 10 times by mole the stoichiometric amount in continuous hydrolysis.

5. A process according to claim 1, wherein the hydrolysis is carried out at 60° to 140° C.

6. A process according to claim 5, wherein the hydrolysis carried out at 80° to 120° C.

7. A process according to claim 1, wherein the hydrolysis is carried out for 0.1 to 10 hours.

* * * * *